(12) United States Patent
DeRoche et al.

(10) Patent No.: US 7,004,689 B2
(45) Date of Patent: Feb. 28, 2006

(54) HIGH-SPEED MILLING CUTTER AND INSERT

(75) Inventors: Kenneth G. DeRoche, Greensburg, PA (US); Mark A. Francis, Solon, OH (US); Brian D. Hoefler, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 37 days.

(21) Appl. No.: 10/754,825

(22) Filed: Jan. 9, 2004

(65) Prior Publication Data

US 2005/0152753 A1 Jul. 14, 2005

(51) Int. Cl.
*B23C 5/22* (2006.01)

(52) U.S. Cl. .............................. 407/48; 407/67; 407/33
(58) Field of Classification Search ................. 407/48, 407/67, 33, 113, 102, 103
See application file for complete search history.

(56) References Cited

U.S. PATENT DOCUMENTS

| | | | |
|---|---|---|---|
| 2,289,344 A | | 7/1942 | Cedarleaf |
| 4,315,706 A | | 2/1982 | Erkfritz |
| 4,411,564 A | * | 10/1983 | Johnson ..................... 407/113 |
| 4,852,622 A | | 8/1989 | Eriksson |
| 4,919,573 A | | 4/1990 | Tsujimura et al. |
| 4,940,369 A | | 7/1990 | Aebi et al. |
| 5,071,292 A | * | 12/1991 | Satran ......................... 407/116 |
| 5,167,473 A | | 12/1992 | Barnett |
| 5,193,946 A | * | 3/1993 | Arai et al. .................. 407/113 |
| 5,221,162 A | * | 6/1993 | Okawa ......................... 407/40 |
| 5,486,073 A | | 1/1996 | Satran et al. |
| 5,593,255 A | | 1/1997 | Satran et al. |
| 5,653,274 A | | 8/1997 | Johnson et al. |
| 5,836,724 A | | 11/1998 | Satran et al. |
| 5,853,267 A | | 12/1998 | Satran et al. |
| 5,893,683 A | | 4/1999 | Johnson |
| 5,921,720 A | * | 7/1999 | Lemke ......................... 407/42 |
| 6,048,140 A | | 4/2000 | Johnson |

(Continued)

FOREIGN PATENT DOCUMENTS

EP 0 582 981 A1 2/1994

OTHER PUBLICATIONS

Mitsubishi Carbide Brochure LJ408A, "Shoulder type Indexable end mill for aluminum alloy, BXD Type," Mitsubishi Materials U.S.A. Corporation, Irvine, California, Mar. 2003, 6 pages.

*Primary Examiner*—Willmon Fridie, Jr.
(74) *Attorney, Agent, or Firm*—Larry R. Meenan (57) ABSTRACT

A high-speed milling cutter (10) includes a shank (12), a front portion (14), and a transition surface (16) between the shank (12) and the front portion (14). The cutter (10) also includes an insert pocket (20) having a bottom surface (22) and side surfaces (24, 26). The bottom surface (22) includes a raised boss (28) for supporting a cutting insert (30). The cutting insert (30) has a top surface (32), a bottom surface (34) and side surfaces (36, 38, 40, 42). The cutting insert (30) includes a primary cutting edge (44, 46) formed at an intersection between the top surface (32) and two of the side surfaces (36, 38, 40, 42). The top surface (32) of the cutting insert (30) includes a concave or dish-shaped topography that is designed for high-speed milling operations of a metallic work piece. The cutting insert (30) also includes a bore (76) in the bottom surface (34) capable of receiving the raised boss (28) for securely retaining the cutting insert (30) within the insert pocket (20), and reducing bending moment on retaining screw 64 during high-speed milling operations.

14 Claims, 7 Drawing Sheets

U.S. PATENT DOCUMENTS

| | | |
|---|---|---|
| 6,102,630 A | 8/2000 | Flolo |
| 6,203,251 B1 * | 3/2001 | Oppelt et al. ............. 407/48 |
| 6,503,028 B1 * | 1/2003 | Wallstrom ............. 407/35 |
| 6,530,726 B1 | 3/2003 | Nelson |
| 6,722,823 B1 * | 4/2004 | de Souza et al. ............. 407/40 |
| 2002/0037199 A1 | 3/2002 | Satran et al. |
| 2002/0146293 A1 | 10/2002 | Nelson |
| 2003/0170079 A1 | 9/2003 | Daiguji et al. |
| 2004/0071515 A1 | 4/2004 | Arvidsson et al. |

* cited by examiner

HIGH-SPEED MILLING CUTTER AND INSERT

BACKGROUND OF THE INVENTION

1. Field of the Invention

This invention relates to a high-speed milling cutter and insert. More particularly, this invention relates to a high-speed milling cutter and insert for milling a metallic work piece, such as aluminum, or the like.

2. Description of the Related Art

Milling cutters for performing machining operations on metallic work pieces are well known in the prior art. Such cutters typically comprise a cylindrical or disc-shaped body which is detachably connectable to a rotating drive shaft. A plurality of cutting inserts are mounted around the outer periphery of the cutter body for producing a series of metal-shaving cuts on a work piece. In operation, such milling cutters are typically rotated at speeds of several thousand rpm while a metal work piece is engaged with the inserts in the cutter body.

Recently, there has been an increased demand for milling cutters capable of operating at rotational speeds far in excess of several thousand rpm. The advantages associated with such high-speed milling include a faster cutting action which results in a higher metal removal rate on the work piece, a reduction in the cutting forces applied to the cutting inserts by the work piece, and a smoother final cut. Such reduced cutting forces protract the operating life of the inserts, not only reducing the costs associated with insert replacement, but also the amount of downtime necessary to reorient the cutting edges of indexable inserts. The cost and time of fixturing is also reduced because higher cutting forces require more elaborate and more rigid fixturing to achieve desired accuracy.

As a result of these advantages, a high-speed milling cutter not only lowers machining costs while increasing productivity, but also enhances the quality of the final machined work piece since the cutting action is smoother, and leaves a better finish. It will be appreciated that the substantial increase in rotational speed necessary to obtain all the aforementioned advantages also results in a substantial increase in the centrifugal forces generated in the body of the cutter. Generally speaking, the centrifugal force $F_c$ is dependent upon the mass (m) of the cutter body supporting the cutting insert, the length of the radius (r) of the cutter body, and the square of the angular velocity ($\Omega$) of the body. The relationship between these parameters may be expressed in the equation $F_c=(m\Omega^2)(r)$. The fact that the centrifugal force (and hence tensile stress) on the cutter body increases with the square of the angular velocity has, up to now, posed a substantial obstacle in the development of a milling cutter capable of operating at speeds higher than several thousand rpm. A milling cutter rotating at 10,000 rpm would have 25 times more centrifugally induced tensile stress along its periphery than when it was operated at 2,000 rpm. If the same cutter is spun at 20,000 rpm, it would have over 100 times more centrifugally induced tensile stress.

In addition, the substantial increase in rotational speed necessary to obtain all the aforementioned advantages also results in a substantial increase in the centrifugal forces generated on the inserts of the cutter. Specifically, the centrifugal forces tend to cause the inserts to become unseated from the insert pocket during high-speed milling operations. Thus, there is a need for a high-speed milling cutter capable of operating at high speeds, for example, about 20,000 rpm that securely and positively retains the cutting inserts within the insert pockets of the cutter body. Ideally, such a high-speed milling cutter and cutting inserts should be relatively inexpensive to manufacture, and should utilize inexpensive, readily replaceable cutting inserts so as to minimize both the cost of fabrication and operation of the device.

Finally, the art of machining materials such as aluminum teaches that the trend is for incorporation of vacuum systems to rid the work area of cut material (chips) in the immediate vicinity of the tool. These systems are quick to clog if the shape and/or size of the chips are not controlled to manageable levels. Thus, the successful tool will be one whose insert topography generates the controlled chip.

SUMMARY OF THE INVENTION

The inventors of the present invention have recognized these and other problems associated with high-speed milling cutters and associated cutting inserts. Briefly, according to this invention, there is provided a high-speed milling cutter comprising a shank having an insert pocket with a raised boss, and at least one cutting insert having a top surface, a bottom surface and side surfaces. The cutting insert has a primary cutting edge formed at an intersection between the top surface and one of the side surfaces. The cutting insert includes a recess in the bottom surface capable of receiving the raised boss for securely retaining the cutting insert in the insert pocket during high-speed milling operations. The cutting insert includes rake face geometry for controlling the size/shape of the cut work piece material.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
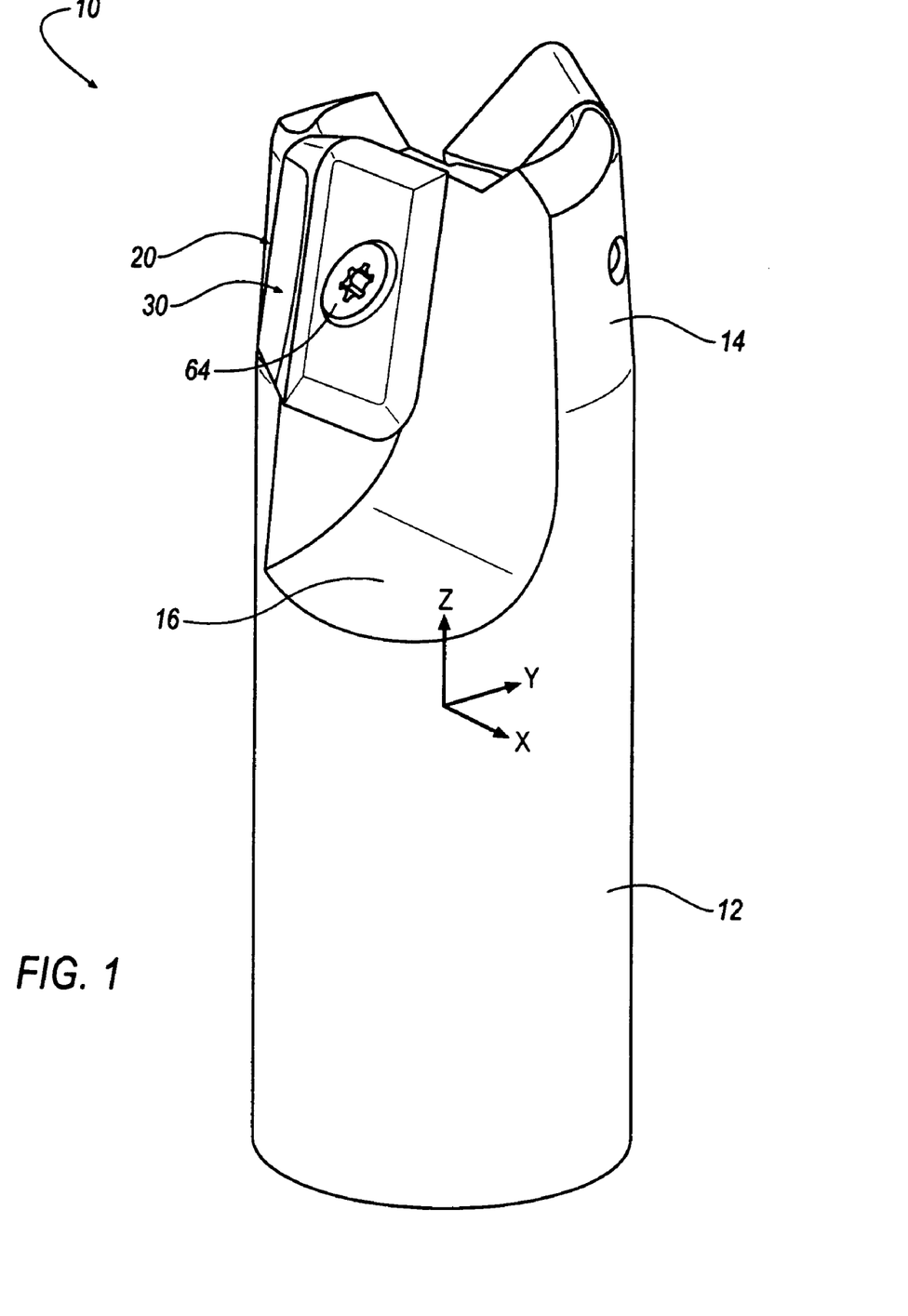
FIG. 1 shows a perspective view of the milling cutter according to an embodiment of the invention.
Figure 3:
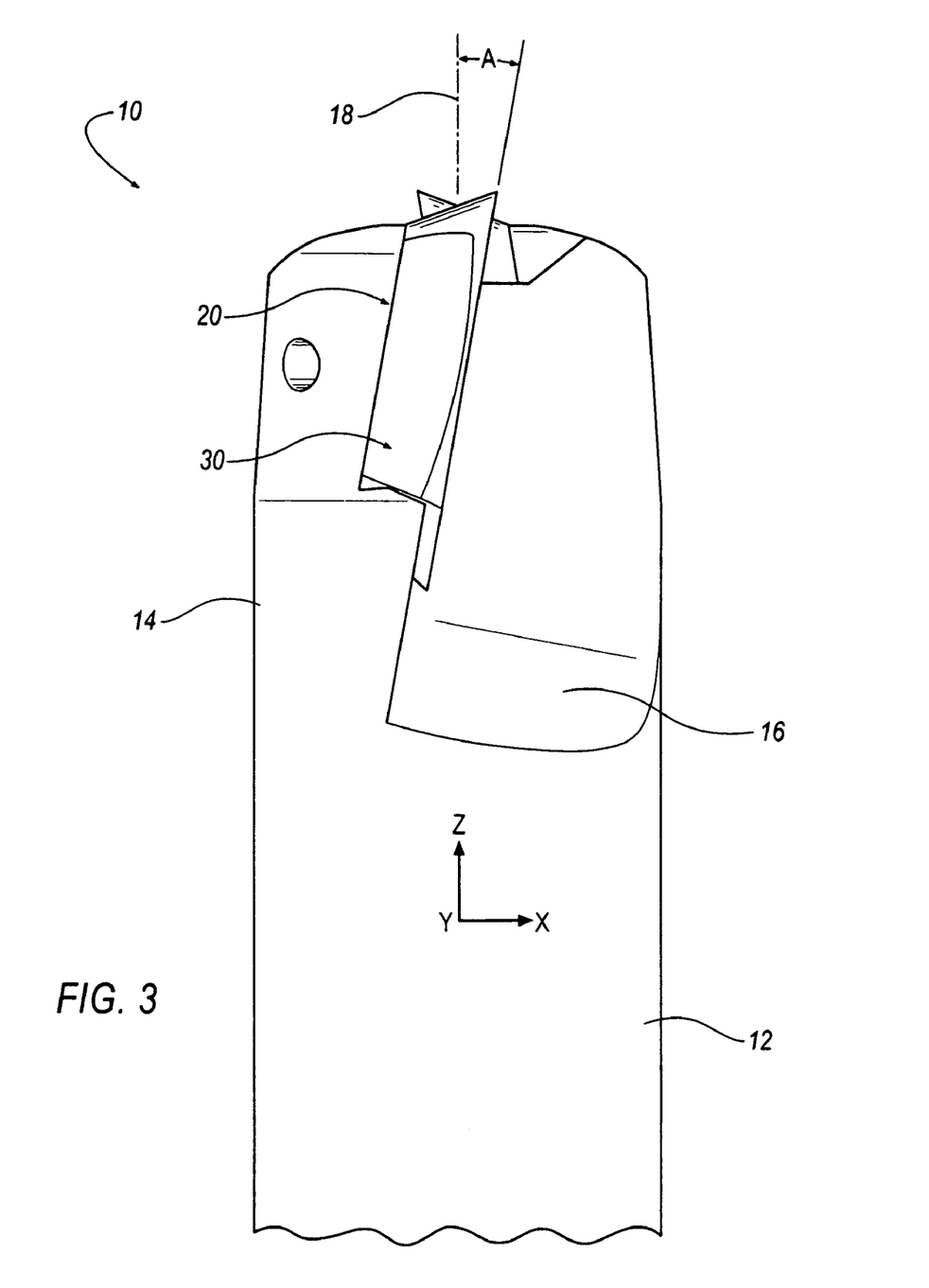
FIG. 3 shows an elevational view of the milling cutter of FIG. 1.

Referring to the drawings, wherein like reference characters represent like elements, a milling cutter 10 is shown according to an embodiment of the invention. As shown in FIG. 1, the milling cutter 10 includes a shank 12, a front portion 14 and a transition surface 16 between the shank 12 and the front portion 14. The cutter 10 is preferably made from heat-treated steel, such as H13 tool steel, or other materials known to those skilled in the art. The specific material used will vary as a consequence of desired design characteristics of the cutter 10. The cutter 10 defines a rotational axis 18, as shown in FIG. 3. The cutter 10 also includes an insert pocket, shown generally at 20 formed in the front portion 14 at the leading end of the cutter 10.

Figure 2:
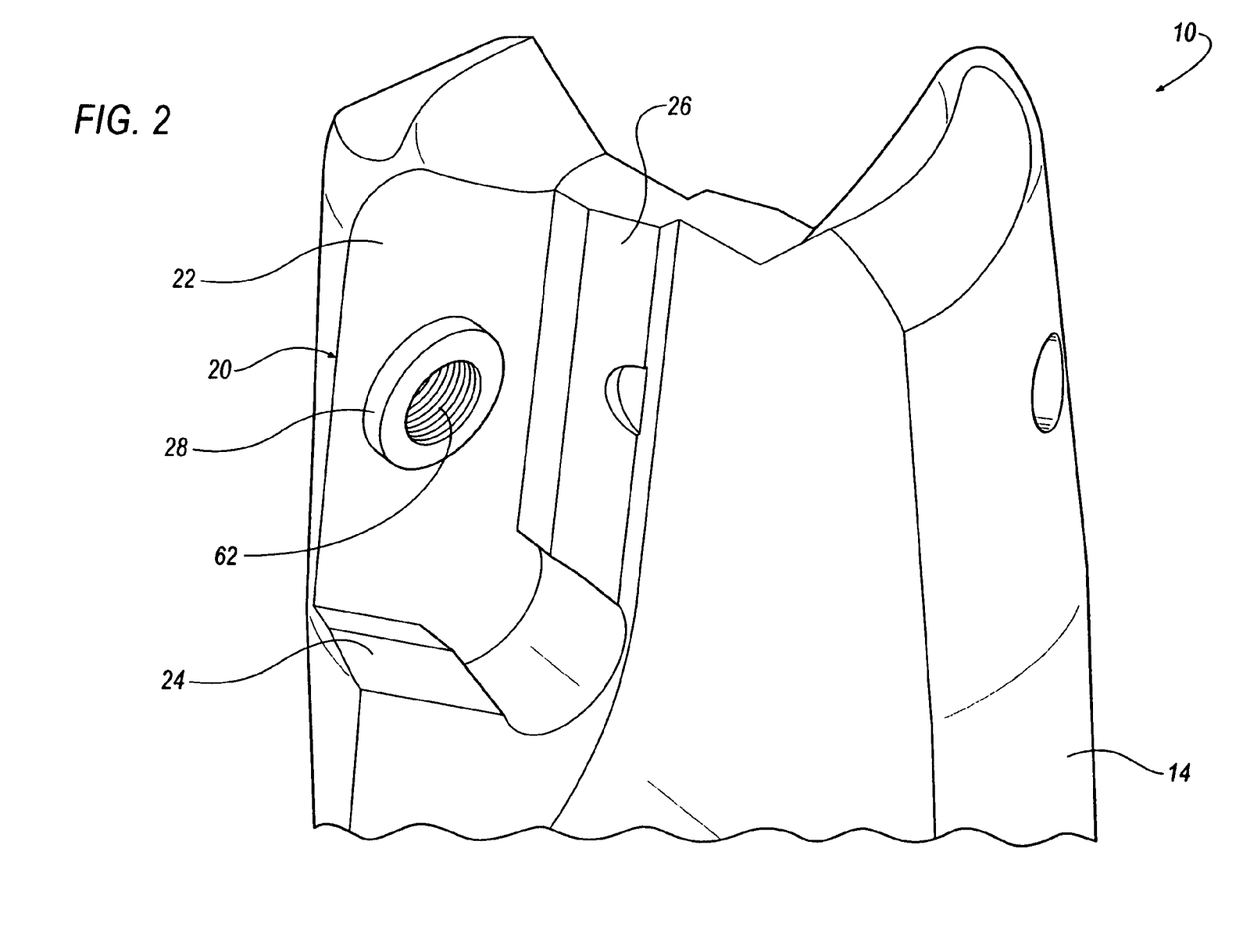
FIG. 2 shows an enlarged perspective view of the milling cutter of FIG. 1 when the cutting inserts are removed.

As shown in FIG. 2, the insert pocket 20 includes a bottom surface 22 and a pair of side surfaces 24, 26. One aspect of the invention is that the bottom surface 22 includes a raised boss 28 that is sized to any desirable shape and positioned to receive and support a cutting insert, shown generally at 30, as described in more detail below. In the illustrated embodiment, the raised boss 28 is round in shape. However, it will be appreciated by one skilled in the art that the raised boss 28 can be any desirable shape so as to restrain the lateral movement of the cutting insert 30. For example, the shape of the raised boss 28 can be square, rectangular, or the like. In addition, the insert pocket 20 may include a plurality of raised bosses 28, instead of a single raised boss 28 as shown in the illustrated embodiment.

Figure 4:
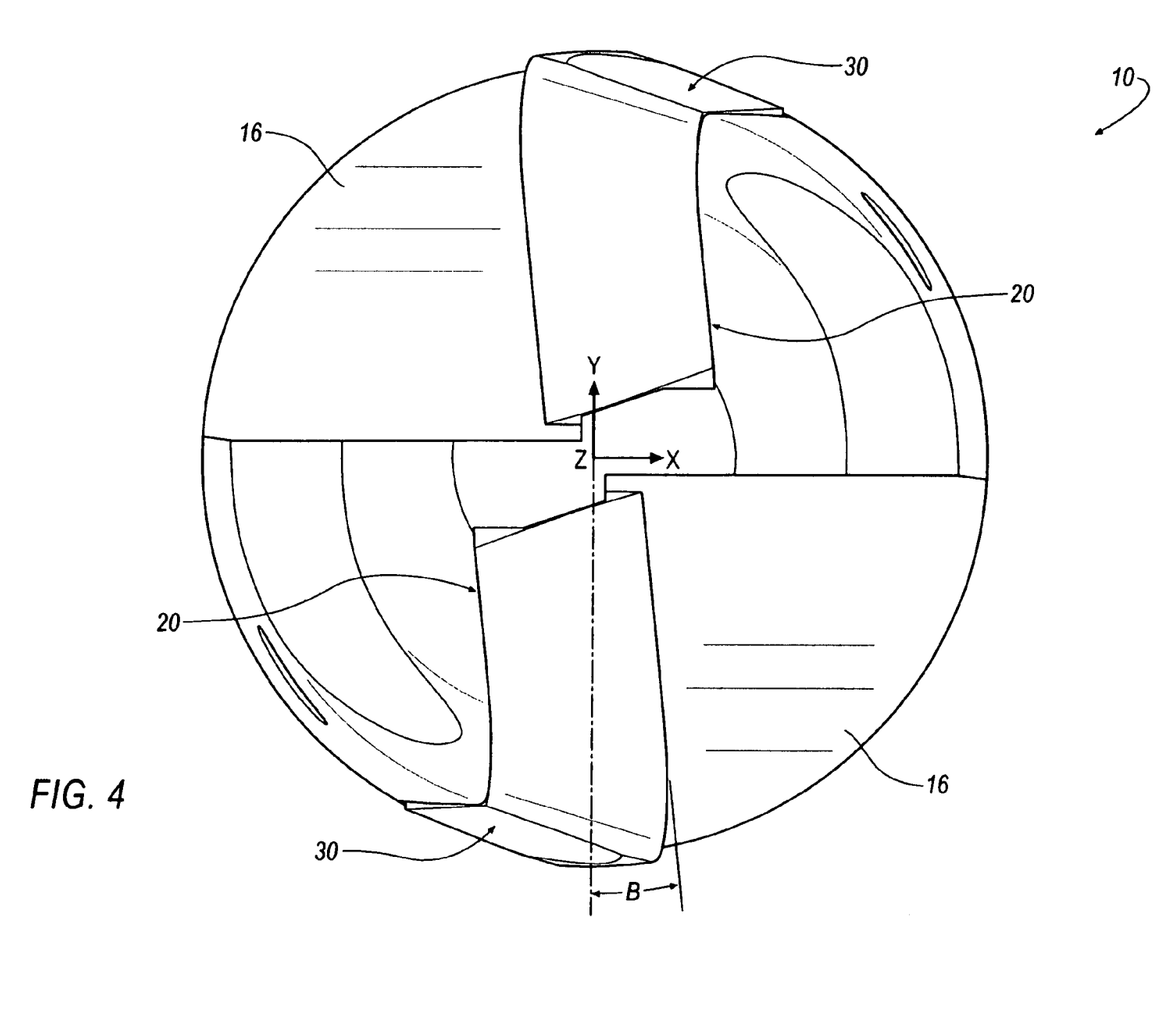
FIG. 4 shows a top view of the milling cutter of FIG. 1.

The insert 30 is preferably made from cemented carbide or other materials known to those skilled in the art for milling a metallic work piece (not shown), such as aluminum, or the like. As seen in FIGS. 3 and 4, the cutting insert 30 is mounted in the insert pocket 20 at an axial rake angle, A, of between approximately fifteen (15) and twenty-five (25) degrees, and a radial rake angle, B, sufficient to allow proper clearance under the secondary cutting edge 46, between plus ten (10) and minus twenty (20) degrees, based on cutter diameter.

With reference to FIGS. 5–8, the cutting insert 30 includes generally, a top surface 32, a bottom surface 34 and side surfaces 36, 38, 40, 42. Radiused primary cutting edges 44, 52 are defined at the intersections between tertiary cutting edges 48, 56 and radiused secondary cutting edges 46, 54, respectively. The radiused secondary cutting edges 46, 54 are defined generally at the intersection between the top surface 32 and the side surfaces 36, 40, respectively. The tertiary cutting edges 48, 56 are defined generally at the intersection between the top surface 32 and the side surfaces 38, 42. More specifically, the radiused secondary cutting edges 46, 54 are formed by the intersection of radiused upper edges 70, 72 and the tertiary cutting edges 48, 56. A portion of the tertiary cutting edge 48, 56 nearest the radiused primary cutting edge 44, 52 is used when the cutting insert 30 performs down ramping operations, defined as increased axial depth of cut as the tool progresses along a work piece (not shown). However, the remaining portion of the tertiary cutting edge 48, 56 distal the primary cutting edges 44, 52 is a trailing edge that does not participate in the cutting of the work piece. The tertiary cutting edge 48, 56 forms an angle with the secondary cutting edge 46, 54 of less than ninety (90) degrees, for example, in a range of approximately forty-five (45) degrees to approximately eighty-five (85) degrees. The remaining edges of the cutting insert 30 are defined as transitional edges 49, 57, which is a radius in the illustrations, but would similarly satisfy the concept as any desirable manufacturable shape, such as a chamfer, sharp corner, or the like, giving care for inclusion of radial relief rake faces 50, 58. Generally, the transitional edges 49, 57 are defined at the corner intersections between the top surface 32 and side surfaces 40, 42, respectively. The radial relief rake faces 50, 58 are used to effectively evacuate chips formed during milling operations as discussed below with regard to top surface 32.

As illustrated in FIGS. 5–8, the cutting insert 30 preferably, but not necessarily, includes the above-described cutting edges, radial relief surfaces and other features at diagonally opposite corners. Thus, the cutting insert 30 is mirror symmetric along a line passing through the primary cutting edges 44, 52, or a line passing through the radial relief rake surfaces 50, 58. This mirror symmetry of the cutting insert 30 permits the cutting insert 30 to be used twice before disposal. For example, when the primary cutting edge 44 at one corner becomes unusable, the cutting insert 30 is removed from the insert pocket 20, rotated 180 degrees, and repositioned in the insert pocket 20 to perform milling operations with the second primary cutting edge 52.

Figure 5:
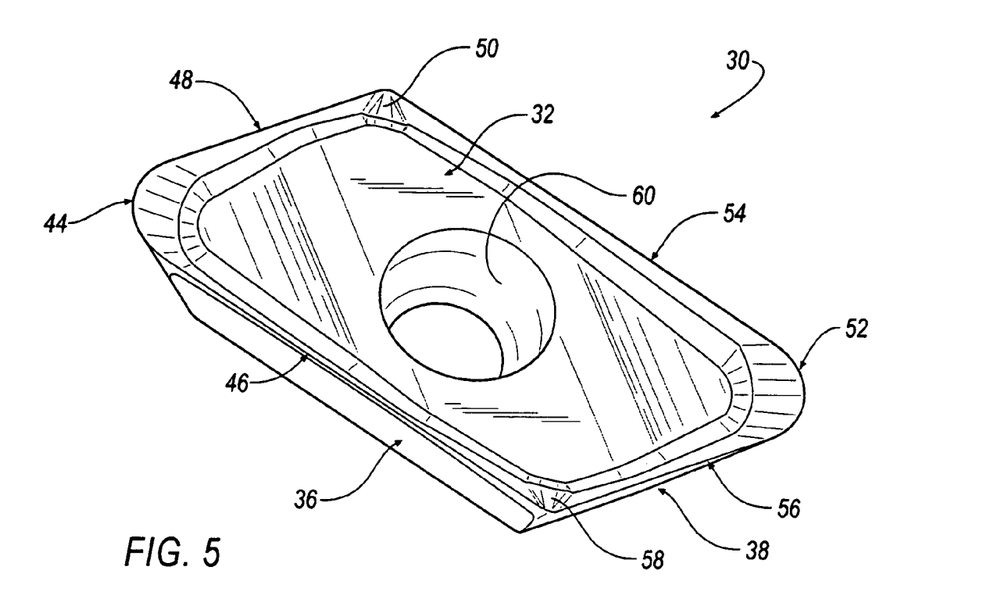
FIG. 5 shows a perspective view of a cutting insert according to an embodiment of the invention.
Figure 6:
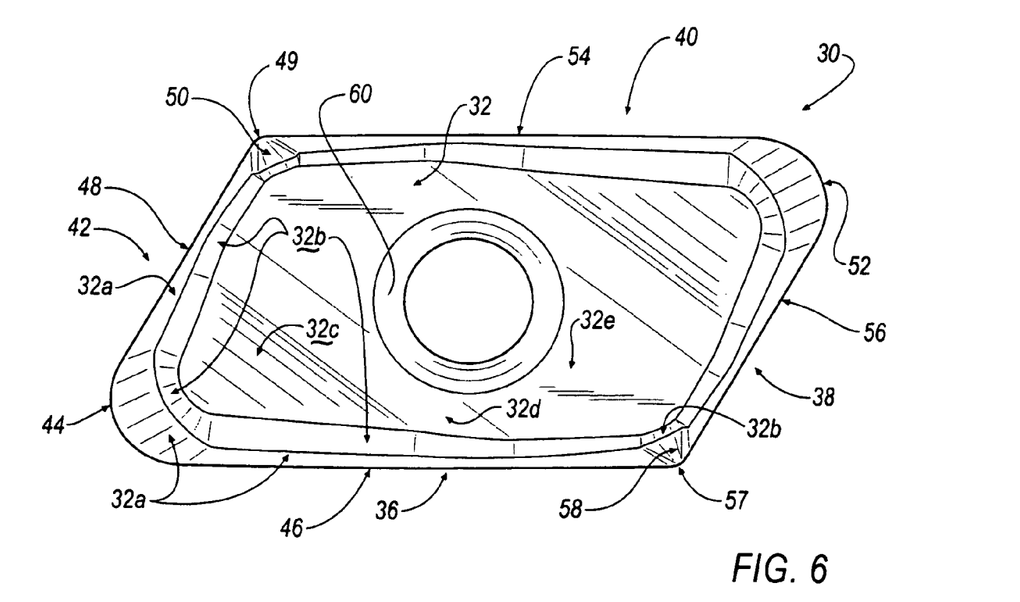
FIG. 6 shows a top view of the cutting insert of FIG. 5.

Referring to FIGS. 5 and 6, to facilitate insertion and removal of the cutting insert 30 in the insert pocket 20, a countersunk bore 60 is provided in the cutting insert 30. The raised boss 28 includes a threaded bore 62 (FIG. 2) communicating with the insert pocket 20. The threaded bore 62 is substantially aligned with the countersunk bore 60 of the cutting insert 30 when the cutting insert 30 is properly mounted in the insert pocket 20. The threaded bore 62 is sized and positioned to threadably receive a threaded fastener 64, such as a retainer screw or the like, positioned in the countersunk bore 60, whereby the insert 30 may be securely, but releasably mounted in the insert pocket 20. Because the raised boss 28 extends outwardly from the bottom surface 22 of the insert pocket 20, the length of the retainer screw 64 can be shortened by the height of the raised boss 28, as compared to a conventional insert pocket. As a result of the shortened projected height, the retainer screw 64 operates with less bending moment during high-speed milling operations, as compared to conventional milling cutters.

As seen in FIGS. 5 and 6, the top surface 32 of the cutting insert 30 includes a concave topography that is designed for high-speed milling operations of a metallic work piece, such as aluminum or the like. The topography of the top surface 32 enables the cutting insert 30 to provide an effectively positive radial rake angle of between about fifteen (15) degrees and about thirty-five (35) degrees when mounted in the insert pocket 20. Specifically, the top surface or rake face 32 of the cutting insert 30 includes a downward sloping primary rake face 32a, extending from the primary cutting edge 44, secondary cutting edge 46, and tertiary cutting edge 48. The primary rake face 32a meets a generous radius transition blend 32b that transitions to an upward sloping secondary rake face 32c. A radius transition blend 32d that transitions into the tertiary rake face 32e that is generally parallel to the bottom surface 34. The effect on the work piece material removed will vary based on the relative locations of the rake faces 32a, 32c, 32e and transition blends 32b, 32d that are confined by the cutting edges 44, 46, 48. For example, in shallow cuts (low axial depths of cut), chip loads tend to be higher, and the deeper extent of the primary rake face 32a facilitates continued shearing action. As the cut depth increases, the tendency for chip load is lessened. The decreasing depth of primary rake face 32a allows the material to continue to see positive shear, and the secondary rake face 32c, and the tertiary rake face 32e convince the cut material to make its exit from the area of the insert pocket 20. Thus, for deeper cuts (high axial depths of cut), at lower feed rates (chip load per tooth) the geometry is sufficient for chip flow, yet the insert's cross-sectional thickness is not detrimentally reduced. The radial relief rake face 50 is similar to the primary rake face 32a, in that it too, is downward sloping. However, because of the composite design of the top surface 32, it is necessary for relief rake face 50 to be much more generous in transition from the boundaries established by the secondary radiused cutting edge 46, the transition edge 49, and the tertiary cutting edge 48. As the removed material from the work piece passes the primary rake face 32a, in extreme axial depth of cut conditions, it is taught that the material will tend to build up in said area and create either unacceptable work piece chip forms, and/or force catastrophic deformation of the non-cutting segment of the tertiary cutting edge 48, and the transition edge 49. Because the bottom surface 34 of the cutting insert 30 is substantially planar, the cutting insert 30 has the greatest thickness (and the highest elevation) at the radiused primary cutting edge 44, and the radiused secondary cutting edge 46, which is most suitable to withstand the stresses induced on the cutting insert 30 during high-speed milling operations.

Figure 7:
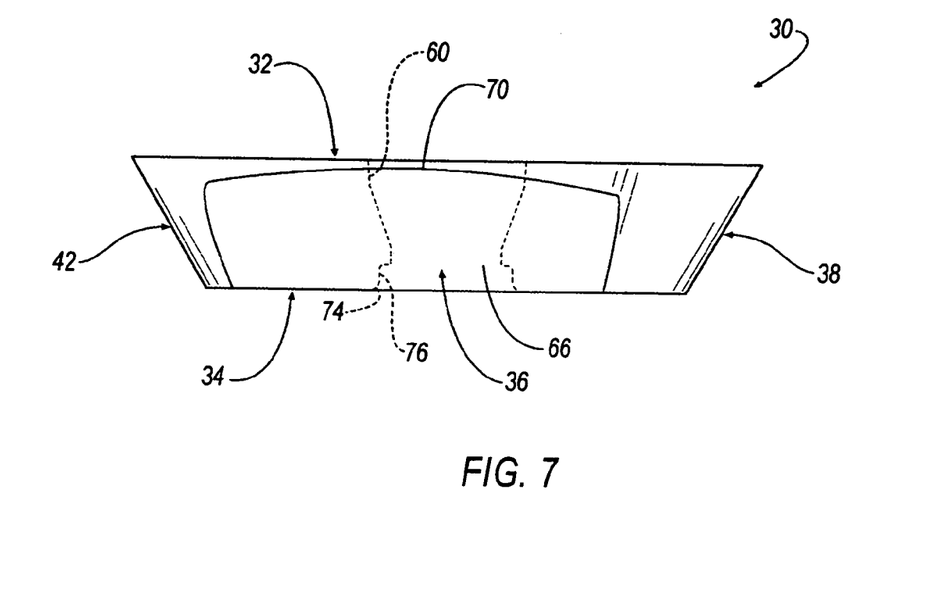
FIG. 7 shows an elevational view of the cutting insert of FIG. 5.
Figure 8:
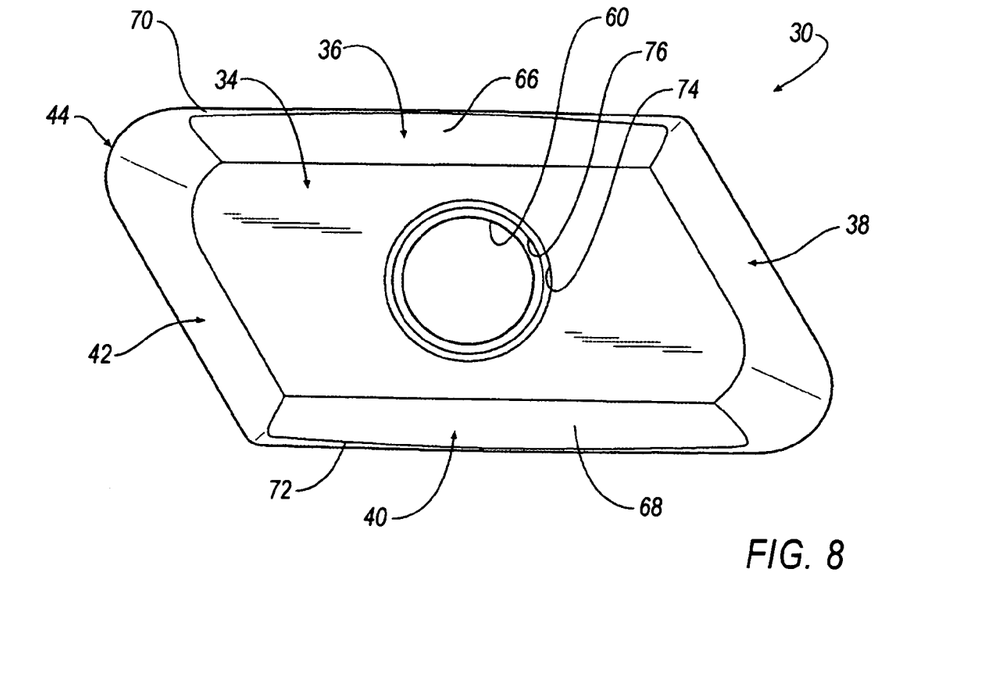
FIG. 8 shows a bottom view of the cutting insert of FIG. 5.

Preferably, but not necessarily, the side surfaces 36, 40 include an angled flat surface 66, 68, respectively, extending from the bottom surface 34, as seen in FIGS. 7 and 8. Each angled flat surface 66, 68 include a radiused upper edge 70, 72, respectively. The flat surfaces 66, 68 act as a primary relief surface for seating the insert 30 in the pocket 20, with secondary and tertiary contacts along pocket side surfaces 26, 24, respectively. The radiused upper edges 70, 72 facilitate in the formation of ninety (90) degree cylindrical walls on the work piece as is commonly used in the art.

As seen in FIG. 8, opposite the countersunk bore 60 is a bore 76 extending into the cutting insert 30 from the bottom surface 34 with a marginally larger diameter than the diameter of the countersunk bore 60 of the raised boss 28 (FIG. 2). The bore 76 preferably has a depth slightly larger than the height of the raised boss 28. In this manner, the cutting insert 30 is capable of being mounted in the insert pocket 20 such that the raised boss 28 is disposed within the bore 76 of the cutting insert 30, while the bottom surface 34 of the cutting insert 30 engages the bottom surface 22 of the insert pocket 20. In addition, the side surfaces 38, 68 of the cutting insert 30 engage the side surfaces 24, 26 of the insert pocket 20, respectively, to firmly secure the cutting insert 30 in the insert pocket 20 when the cutting edges 44, 46, 48 are being used during milling operations. Similarly, the side surfaces 42, 66 of the cutting insert 30 engage the side surfaces 24, 26 of the insert pocket 20, respectively, to firmly secure the cutting insert 30 in the insert pocket 20 when the cutting edges 52, 54, 56 are being used during milling operations.

Figure 9:
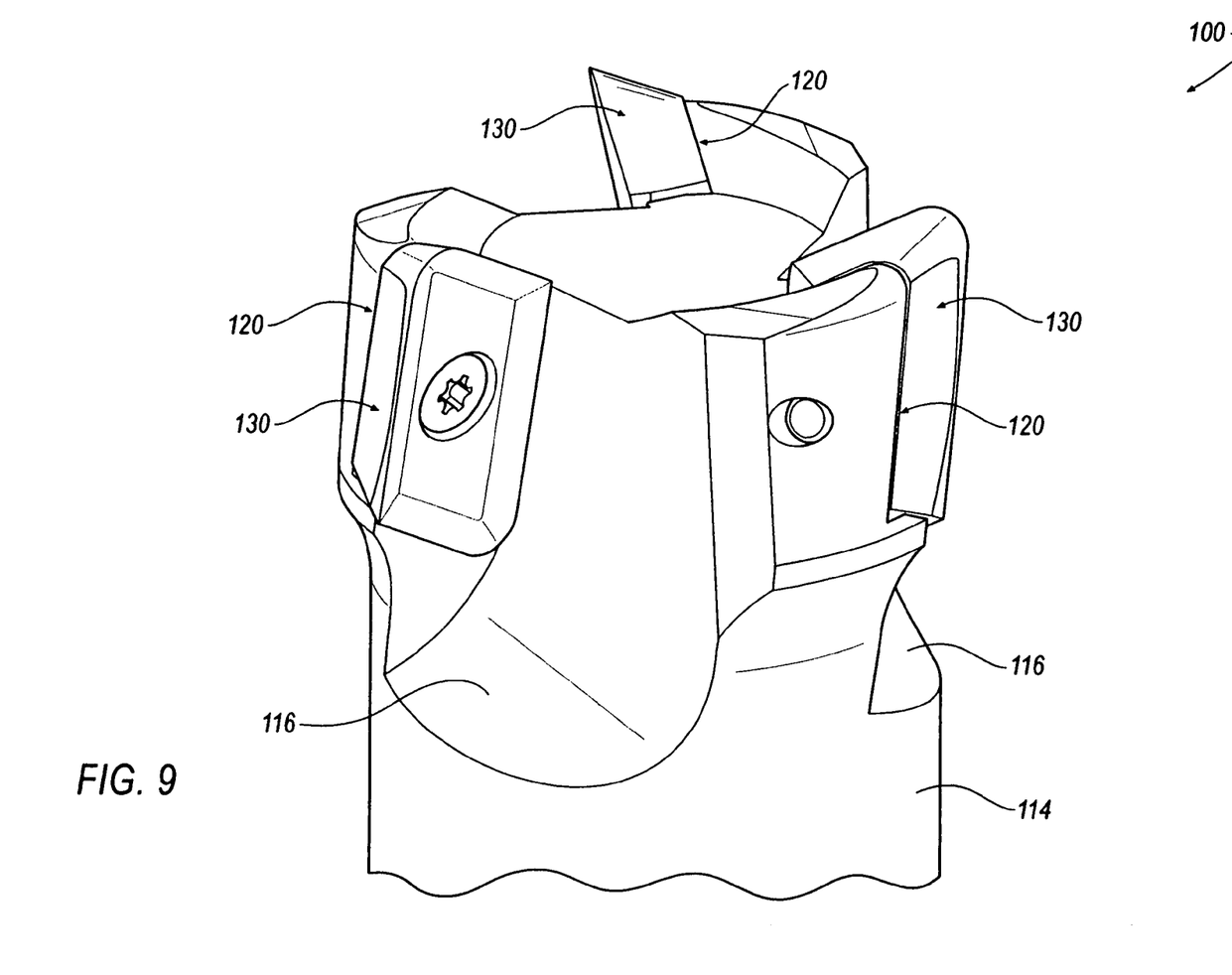
FIG. 9 shows a milling cutter according to an alternative embodiment of the invention.

In the illustrated embodiment of the milling cutter 10 shown in FIGS. 1–8, the milling cutter 10 is capable of mounting two cutting inserts 30 oriented about 180 degrees with respect to each other within a respective insert pocket 20. However, it will be appreciated that the milling cutter of the invention is not limited by the number of cutting inserts 30 that can be mounted in the insert pockets 20, and that the invention can be practiced with any desired number of cutting inserts limited by only the physical limitations of the material properties of the milling cutter. As shown in FIG. 9, for example, a milling cutter 100 includes a front portion 114 and transition surface 116, similar to the milling cutter 10. However, unlike the milling cutter 10, the milling cutter 100 is designed for mounting three (3) cutting inserts 130 within a respective insert pocket 120.

As described above, the milling cutter 10, 100 of the invention provides for a secondary safety feature comprising the raised boss 28 in combination with the bore 76 of the cutting insert 30 that enables the cutting insert 30 to be used for high-speed milling operations. In addition, the milling cutter 10, 100 of the invention provides for the retainer screw 64 to have a shorter projected length not engaged and encompassed by additional material (i.e., boss 28) as compared to conventional milling cutters, enabling the retainer screw 64 to operate with less bending moment during high-speed milling operations.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A cutting insert for a high-speed milling cutter having a shank with an insert pocket for receiving said cutting insert, said cutting insert comprising:
    a top surface, a bottom surface and side surfaces;
    a radiused primary cutting edge defined at the intersection between the top surface and two side surfaces;
    a radiused secondary cutting edge defined at the intersection between the top surface and one of said two side surfaces, said radiused secondary cutting edge extending along a longitudinal axis of said cutting insert;
    a tertiary cutting edge defined at the intersection between the top surface and the other one of said two side surfaces; and
    a transitional edge defined at the intersection between said tertiary cutting edge and said radiused secondary cutting edge,
    wherein said tertiary cutting edge extends entirely between said radiused primary cutting edge and said transitional edge, and
    wherein said tertiary cutting edge has a length shorter than a length of said radiused secondary cutting edge.

2. The cutting insert of claim 1, wherein said top surface of said cutting insert provides a positive radial rake angle of between about fifteen degrees and about thirty-five degrees when said cutting insert is mounted in said insert pocket.

3. The cutting insert of claim 1, wherein said top surface includes a downward sloping primary rake face extending from said radiused primary cutting edge, said radiused secondary cutting edge and said tertiary cutting edge.

4. The cutting insert of claim 3, wherein said top surface includes an upward sloping secondary rake face extending from a radius transition blend adjacent said radiused primary cutting edge.

5. The cutting insert of claim 3, wherein said downward sloping primary rake face facilitates in shearing action and removal of chips from said insert pocket.

6. The cutting insert of claim 4, wherein said secondary rake face transitions into a tertiary rake face that is generally parallel to said bottom surface.

7. The cutting insert of claim 2, wherein at least one of said side surfaces includes an angled flat surface that includes a radiused upper edge.

8. The cutting insert of claim 1, further comprising a. countersunk bore in said top surface and a relatively larger bore in said bottom surface opposite said countersunk bore.

9. The cutting insert of claim 8, wherein said relatively larger bore is capable of receiving a raised boss located on said insert pocket.

10. A high-speed milling cutter, comprising:
    a shank having an insert pocket with a raised boss; and
    at least one cutting insert;
    said at least one cutting insert comprising:
        a top surface, a bottom surface and side surfaces;
        a radiused primary cutting edge defined at the intersection between the top surface and two side surfaces;
        a radiused secondary cutting edge defined at the intersection between the top surface and one of said two side surfaces, said radiused secondary cutting edge extending along a longitudinal axis of said cutting insert;

a tertiary cutting edge defined at the intersection between the top surface and the other one of said two side surfaces;

a transitional edge defined at the intersection between said tertiary cutting edge and said radiused secondary cutting edge; and a bore in said bottom surface capable of receiving said raised boss for mounting said at least one cutting insert in said insert pocket, wherein said tertiary cutting edge extends entirely between said radiused primary cutting edge and said transitional edge, and wherein said tertiary cutting edge has a length shorter than a length of said radiused secondary cutting edge.

11. The milling cutter of claim 10, wherein said raised boss has a substantially circular shape.

12. The milling cutter of claim 10, wherein said raised boss further includes a treaded bore capable of receiving a retainer screw, wherein said raised boss reduces a bending moment on said retainer screw during high-speed milling operations.

13. The milling cutter of claim 10, wherein said at least one cutting insert forms an axial rake angle of between approximately fifteen and twenty-five degrees when mounted in said insert pocket.

14. The milling cutter of claim 10, wherein said at least one cutting insert forms an effective radial rake angle of between about fifteen degrees and about thirty-five degrees when mounted in said insert pocket.

* * * * *